US 6,567,129 B1

(12) United States Patent
Taketani et al.

(10) Patent No.: US 6,567,129 B1
(45) Date of Patent: May 20, 2003

(54) COLOR DEMODULATING DEVICE

(75) Inventors: Nobuo Taketani, Kawanishi (JP); Hiroshi Moribe, Takatsuki (JP); Hisao Morita, Hirakata (JP); Hiroshi Ando, Ibaraki (JP); Ryuichi Shibutani, Takatsuki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/674,845

(22) PCT Filed: Mar. 6, 2000

(86) PCT No.: PCT/JP00/01317
§ 371 (c)(1),
(2), (4) Date: Nov. 7, 2000

(87) PCT Pub. No.: WO00/54514
PCT Pub. Date: Sep. 14, 2000

(30) Foreign Application Priority Data

Mar. 8, 1999 (JP) ............................. 11-060416

(51) Int. Cl.[7] .................... H04N 9/66; H04N 9/455
(52) U.S. Cl. .............. 348/638; 348/639; 348/726; 348/727; 348/537; 348/507
(58) Field of Search ................. 348/638, 639, 348/640, 641, 507, 644, 645, 657, 713, 726, 727, 536, 537, 539; 375/324, 327; 329/306, 307, 361, 360, 350

(56) References Cited

U.S. PATENT DOCUMENTS

| | | | | |
|---|---|---|---|---|
| 4,091,410 A | * | 5/1978 | Citta | 348/726 |
| 4,799,102 A | * | 1/1989 | Kobayashi | 348/639 |
| 5,440,349 A | * | 8/1995 | Ban | 348/638 |
| 5,459,524 A | * | 10/1995 | Cooper | 348/507 |
| 5,512,960 A | * | 4/1996 | Hatano | 348/640 |
| 5,654,767 A | * | 8/1997 | Ikeda et al. | 348/638 |
| 5,815,220 A | * | 9/1998 | Marshall | 348/727 |
| 5,825,242 A | * | 10/1998 | Prodan et al. | 329/304 |
| 6,034,735 A | * | 3/2000 | Senbongi et al. | 348/505 |
| 6,064,442 A | * | 5/2000 | Aihara | 348/507 |

FOREIGN PATENT DOCUMENTS

| | | |
|---|---|---|
| EP | 155675 | 3/1985 |
| JP | 64-5189 | 1/1989 |
| JP | 64-060178 | 3/1989 |
| JP | 1-155795 | 6/1989 |
| JP | 2-135894 | 5/1990 |
| JP | 5-207497 | 8/1993 |
| JP | 5-207499 | 8/1993 |
| JP | 6-335017 | 12/1994 |
| JP | 8-140114 | 5/1996 |

* cited by examiner

Primary Examiner—John Miller
Assistant Examiner—Jean W. Désir
(74) Attorney, Agent, or Firm—Wenderoth, Lind & Ponack, L.L.P.

(57) ABSTRACT

A color demodulation apparatus having color demodulation capabilities as the conventional ones, with its size reduced by sharing part of processing circuit therein is provided.

An adder circuit 10 and a SW circuit 11 shift the phase of a ramp wave generated by a VCO circuit 9 alternately 90 degrees and 180 degrees for each clock. A SIN data generator circuit 12 generates a phase alternate SIN wave signal from the shifted ramp wave. A multiplier circuit 3 performs R-Y and B-Y demodulation through multiplexing based on the phase alternate SIN wave signal. An accumulator circuit 6 accumulates burst signals of each of R-Y and B-Y signals of the demodulated, multiplexed signal. A second load hold circuit 8 separately outputs an R-Y burst signal to the VCO circuit 9, and a B-Y burst signal to a comparator circuit 13, constituting two feedback loops. A first load hold circuit 5 separates R-Y and B-Y signals from the multiplexed signal, and outputs these two signals.

10 Claims, 10 Drawing Sheets

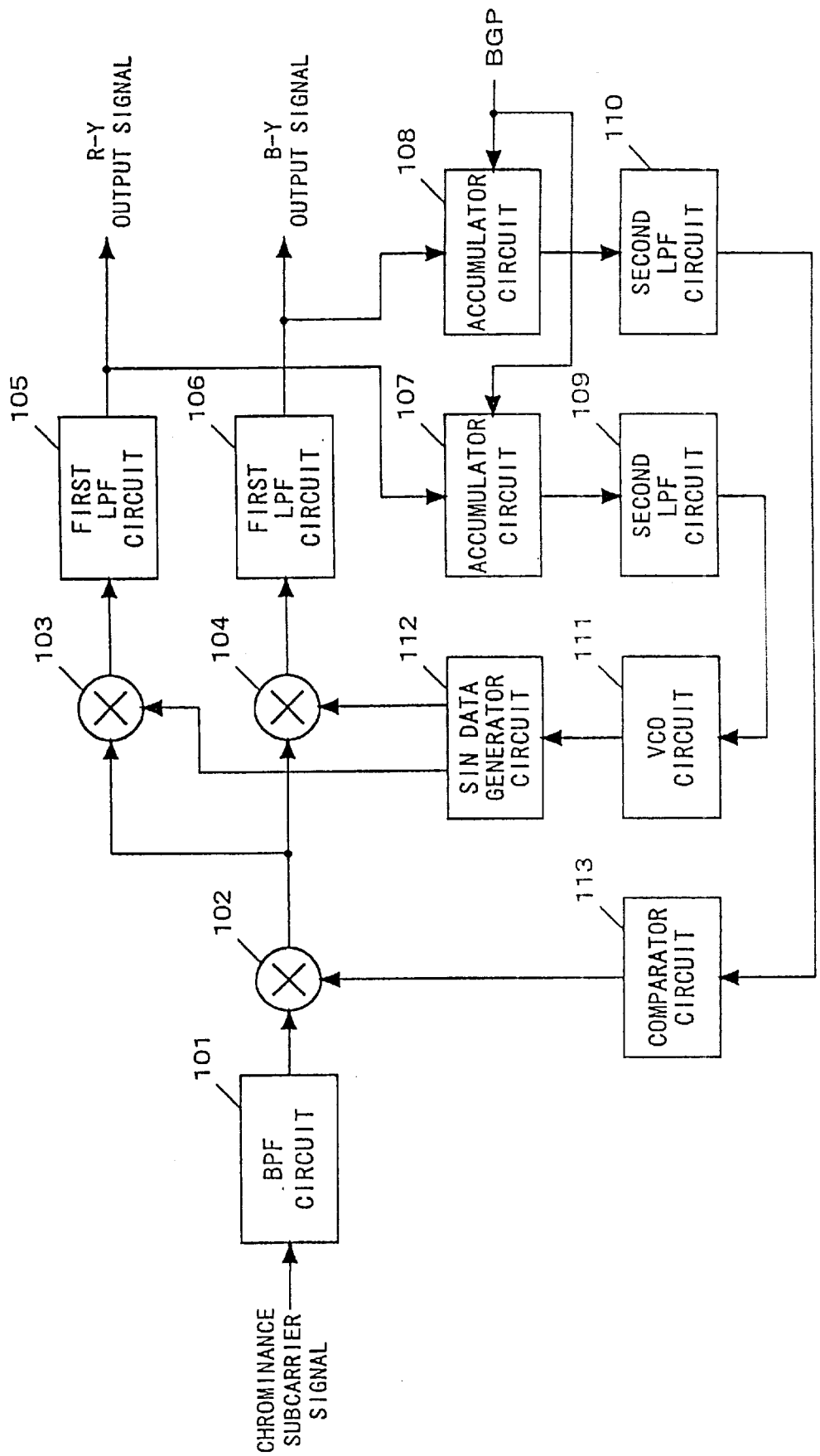
FIG. 11 · PRIOR ART

COLOR DEMODULATING DEVICE

TECHNICAL FIELD

The present invention relates to color demodulation apparatuses and, more specifically, to an apparatus color-modulating a chrominance subcarrier signal separated from a composite television video signal through digital processing.

BACKGROUND ART

With recent advances in video quality, digitalization of television video signals has been required. To cope with digitalization, a color demodulation apparatus such as disclosed in Japanese Patent Laid-Open Publication No. 8-140114 (hereinafter referred to as prior document) has been suggested for color signal demodulation.

The conventional color demodulation apparatus disclosed in the above prior document is described below.

FIG. 11 shows a block diagram illustrating the configuration of the conventional color demodulation apparatus disclosed in the above prior document.

In FIG. 11, the conventional color demodulation apparatus includes a BPF circuit 101, multiplier circuits 102 to 104, first LPF circuits 105 and 106, accumulator circuits 107 and 108, second LPF circuits 109 and 110, a VCO circuit 111, a SIN data generator circuit 112, and a comparator circuit 113.

The BPF circuit 101 is a band-pass filter circuit allowing passage of the frequency band of a chrominance subcarrier signal. The BPF circuit 101 is supplied with the chrominance subcarrier signal separated from a composite digital video signal, and eliminates signal components of an unnecessary frequency band. According to gain control from the comparator circuit 113 which will be described later, the multiplier circuit 102 controls its output to keep a predetermined amplitude with respect to the received chrominance subcarrier signal. This control is generally called Auto Color Control (hereinafter referred to as ACC). The multiplier circuit 103 is supplied with the chrominance subcarrier signal after ACC processing outputted from the multiplier circuit 102, and multiplies the chrominance subcarrier signal by a 90-degree-phase-shifted SIN wave signal outputted from the SIN data generator circuit 112 for R-Y demodulation. The multiplier circuit 104 is supplied with the chrominance subcarrier signal after ACC processing outputted from the multiplier circuit 102, and multiplies the chrominance subcarrier signal by a 180-degree-phase-shifted SIN wave signal outputted from the SIN data generator circuit 112 for B-Y demodulation. The first LPF circuit 105 is a low-pass filter allowing passage of the frequency band of an R-Y signal, eliminating predetermined high frequency band components (such as noise) from a signal after demodulation by the multiplier circuit 103 and then outputting the R-Y signal. The first LPF circuit 106 is a low-pass filter allowing passage of the frequency band of a B-Y signal, eliminating predetermined high frequency band components (such as noise) of a signal after demodulation by the multiplier circuit 104 and then outputting the B-Y signal.

The R-Y signal from the first LPF circuit 105 is fed to the accumulator circuit 107. The accumulator circuit 107 accumulates the R-Y signal during a burst signal period of one horizontal period, that is, a burst signal according to a burst gate pulse (hereinafter referred to as BGP) from a horizontal deflection apparatus (not shown). The accumulated the burst signal is supplied through the second LPF circuit 109 to the VCO circuit 111. The VCO circuit 111 is a voltage controlled oscillator circuit capable of varying the period of a ramp wave, which is an output signal therefrom, according to the magnitude of a received signal. According to the received accumulated burst signal, the VCO circuit 111 controls the period of the ramp wave to be outputted to synchronize with that of the burst signal. Using the ramp wave from the VCO circuit 111, the SIN data generator circuit 112 generates a 90-degree-phase-shifted SIN signal and a 180-degree-phase-shifted SIN signal with respect to the period of the ramp wave, and then outputs the 90-degree-phase-shifted SIN signal to the multiplier circuit 103 and the 180-degree-phase-shifted SIN signal to the multiplier circuit 104.

By constituting a feedback loop as described above (hereinafter referred to as first feedback loop), the conventional color demodulation apparatus can perform accurate R-Y and B-Y demodulation always in synchronization with the burst signal.

On the other hand, the B-Y signal from the first LPF circuit 106 is fed to the accumulator circuit 108. Like the above, the accumulator circuit 108 accumulates a burst signal according to a BGP from the horizontal deflection apparatus. The accumulated the burst signal is supplied through the second LPF circuit 110 to the comparator circuit 113. The comparator circuit 113 has a predetermined reference value therein, and compares the value of the accumulated burst signal from the second LPF circuit 110 with the reference value. The comparator circuit 113 then controls gain of the multiplier circuit 102 so that the value of the accumulated burst signal matches the reference value.

By constituting a feedback loop as described above (hereinafter referred to as second feedback loop), the conventional color demodulation apparatus can always obtain a constant color signal amplitude.

In the conventional color modulation apparatus, however, the circuit for R-Y demodulation (the multiplier circuit 103 and the first LPF circuit 105) and the circuit for B-Y demodulation (the multiplier circuit 104 and the first LPF circuit 106) are formed individually. Furthermore, part of the circuits constituting the first feedback loop (the accumulator circuit 107 and the second LPF circuit 109) and part of the circuits constituting the second feedback loop (the accumulator circuit 108 and the second LPF circuit 110) are provided individually.

Therefore, the above conventional color demodulation apparatus has plural multiplier circuits, accumulator circuits, and LPF circuits, all or part thereof performing similar operation, thereby making the apparatus large in size.

Therefore, an object of the present invention is to provide a color demodulation apparatus having color demodulation capabilities as the conventional ones, with its size reduced by sharing part of processing circuits therein.

DISCLOSURE OF THE INVENTION

The present invention has the following features to solve the problem above.

A first aspect of the present invention is directed to a color demodulation apparatus color-demodulating a chrominance subcarrier signal separated from a composite television video signal through digital processing, comprising:

a frequency divider circuit for generating a predetermined load clock (hereinafter referred to as RCLK) using a system clock (hereinafter referred to as SCLK) which is an operational reference for the apparatus;

a band-pass filter circuit, supplied with the chrominance subcarrier signal, for eliminating signal components of an unnecessary frequency band from the chrominance subcarrier signal;

a first multiplier circuit, supplied with the chrominance subcarrier signal from the band-pass filter circuit, for controlling the chrominance subcarrier signal to be outputted therefrom to keep constant amplitude according to gain controlled by a comparator circuit;

a second multiplier circuit, supplied with the chrominance subcarrier signal after amplitude control outputted from the first multiplier circuit and a phase alternate SIN wave signal outputted from a SIN data generator circuit, for multiplying the signals together for multiplex demodulation of an R-Y signal and a B-Y signal;

a first low-pass filter circuit, supplied with a multiplex-demodulated signal from the second multiplier circuit, for passing frequency bands of the R-Y signal and the B-Y signal and eliminating predetermined high frequency band components;

a first load hold circuit, supplied with the multiplex-demodulated signal with the high frequency band components eliminated outputted from the first low-pass filter circuit, for separating the multiplex-demodulated signal into the R-Y signal and the B-Y signal and outputting the R-Y and B-Y signals according to the RCLK;

an accumulator circuit, supplied with the multiplex-demodulated signal with the high frequency band components eliminated outputted from the first low-pass filter circuit, for accumulating burst signal in the R-Y signal and burst signal in the B-Y signal based on a burst gate pulse (hereinafter referred to as BGP) which provides a burst signal period and outputting each of the accumulated burst signal only once during each horizontal period;

a second low-pass filter circuit, supplied with each burst signal outputted from the accumulator circuit, for passing the frequency bands of the R-Y signal and the B-Y signals and eliminating predetermined high frequency band components;

a second load hold circuit, supplied with each of the burst signal with the high frequency components eliminated outputted from the second low-pass filter circuit, for separating the burst signal into burst signal in the R-Y signal and burst signal in the B-Y signal and outputting each of the burst signal according to the RCLK;

a VCO circuit, supplied with the burst signal in the R-Y signal outputted from the second load hold circuit, for varying and outputting a period of a ramp wave according to a level of the burst signal in the R-Y signal;

a switching circuit, supplied with data corresponding to an R-Y demodulation axis and data corresponding to a B-Y demodulation axis in the ramp wave outputted from the VCO circuit, for alternately switching between the data for output according to the RCLK;

an adder circuit for adding data outputted from the switching circuit to data on the ramp wave outputted from the VCO circuit and outputting a ramp wave;

the SIN data generator circuit for generating and outputting the phase alternate SIN wave signal in synchronization with the ramp wave outputted from the adder circuit; and the comparator circuit, supplied with the burst signal in the B-Y signal outputted from the second load hold circuit, for comparing a value of the burst signal with a predetermined reference value and controlling the gain of the first multiplier circuit so that the value of the burst signal matches the reference value.

As described above, in the first aspect, the color demodulation apparatus is realized by using a multiplex demodulation technique, with circuitry configuration sharing the portion for R-Y demodulation and the portion for B-Y demodulation, and part of the portions constituting the first feedback loop for keeping the amplitude of the chrominance subcarrier signal outputted from the first multiplier circuit constant and part of the portions constituting the second feedback loop for accurate R-Y and B-Y demodulation always in synchronization with the burst signals in the second multiplier circuit. Thus, since plural circuits each performing similar processing are not required, the color demodulation apparatus can be reduced in size.

A second aspect of the present invention is directed to a color demodulation apparatus color-demodulating a chrominance subcarrier signal separated from a composite television video signal through digital processing, comprising:

a frequency divider circuit for generating a predetermined RCLK using a SCLK which is an operational reference for the apparatus;

a band-pass filter circuit, supplied with the chrominance subcarrier signal, for eliminating signal components of an unnecessary frequency band from the chrominance subcarrier signal;

a first multiplier circuit, supplied with the chrominance subcarrier signal from the band-pass filter circuit, for controlling the chrominance subcarrier signal to be outputted therefrom to keep constant amplitude according to gain controlled by a comparator circuit;

a second multiplier circuit, supplied with the chrominance subcarrier signal after amplitude control outputted from the first multiplier circuit and a phase alternate SIN wave signal outputted from a SIN data generator circuit, for multiplying the signals together for multiplex demodulation of an R-Y signal and a B-Y signal;

a first low-pass filter circuit, supplied with a multiplex-demodulated signal from the second multiplier circuit, for passing frequency bands of the R-Y signal and the B-Y signal and eliminating predetermined high frequency band components;

a first load hold circuit, supplied with the multiplex-demodulated signal with the high frequency band components eliminated outputted from the first low-pass filter circuit, for separating the multiplex-demodulated signal into the R-Y signal and the B-Y signal and outputting the R-Y and B-Y signals according to the RCLK;

an accumulator circuit, supplied with the multiplex-demodulated signal with the high frequency band components eliminated outputted from the first low-pass filter circuit, for accumulating burst signal in the R-Y signal and burst signal in the B-Y signal based on a BGP which provides a burst signal period and outputting each of the accumulated burst signal only once during each horizontal period;

a second load hold circuit, supplied with each of the burst signal with the high frequency band components eliminated outputted from the accumulator circuit, for separating the burst signal into the burst signal in the R-Y signal and the burst signal in the B-Y signal and outputting each of the burst signal;

a second low-pass filter circuit, supplied with the burst signal in the R-Y signal outputted from the second load hold circuit, for passing the frequency band of the R-Y signal and eliminating predetermined high frequency band components;

a third low-pass filter circuit, supplied with the burst signal in the B-Y signal outputted from the second load hold circuit, for passing the frequency band of the B-Y signal and eliminating predetermined high frequency band components;

a VCO circuit, supplied with the burst signal in the R-Y signal with the high frequency band components eliminated outputted from the second low-pass filter circuit, for varying and outputting a period of a ramp wave according to a level of the burst signal;

a switching circuit, supplied with data corresponding to an R-Y demodulation axis and data corresponding to a B-Y demodulation axis in the ramp wave outputted from the VCO circuit, for alternately switching between the data for output according to the RCLK;

an adder circuit for adding data outputted from the switching circuit to data on the ramp wave outputted from the VCO circuit and outputting a resultant ramp wave;

the SIN data generator circuit for generating and outputting the phase alternate SIN wave signal in synchronization with the ramp wave outputted from the adder circuit; and the comparator circuit, supplied with the burst signal in the B-Y signal with the high frequency band components eliminated outputted from the third low-pass filter circuit, for comparing a value of the burst signal and a predetermined reference value and controlling the gain in the first multiplier circuit so that the value of the burst signal matches the reference value.

As described above, in the second aspect, the color demodulation apparatus is realized by using a multiplex demodulation technique, with circuitry configuration sharing the portion for R-Y demodulation and the portion for B-Y demodulation, and part of the portions constituting a first feedback loop for keeping the amplitude of the chrominance subcarrier signal outputted from the first multiplier circuit constant and part of the portions constituting a second feedback loop for accurate R-Y and B-Y demodulation always in synchronization with the burst signals in the second multiplier circuit. Thus, since plural circuits each performing similar processing are not required, the color demodulation apparatus can be reduced in size.

Furthermore, in the second aspect, the second low-pass filter circuit for band-limiting the burst signal to be outputted to the VCO circuit and the third low-pass filter circuit for band-limiting the burst signal to be outputted to the comparator circuit are separately provided. Thus, it is possible to make a difference between the frequency characteristics in the first feedback loop and in the second feedback loop, thereby realizing color demodulation of higher image quality.

According to third and fourth aspects, in the first and second aspects, respectively, the accumulator circuit comprises:

an adder circuit for adding an input signal and a signal outputted from an AND circuit together and outputting a resultant signal;

(2×n) latch circuits each delaying the signal outputted from the adder circuit according to timing of the SCLK;

a gain adjuster circuit for adjusting a delay signal outputted as an output signal from a last of the latch circuits with predetermined gain; and the AND circuit, supplied with the BGP, for outputting a signal outputted from the gain adjuster circuit to the adder circuit only during a period of the BGP.

According to fifth to eighth aspects, in the first to fourth aspects, respectively, each of the first to third low-pass filter circuits comprises:

(2×n) latch circuits each delaying an input signal according to timing of the SCLK;

a first gain adjuster circuit for adjusting a delay signal outputted from a last of the latch circuits with predetermined gain;

a second gain adjuster circuit for adjusting an input signal with predetermined gain; and an adder circuit for adding a signal outputted from the first gain adjuster circuit and a signal outputted from the second gain adjuster circuit together and outputting a resultant signal as an output signal.

According to ninth and tenth aspects, in the first and second aspects, respectively, each of the first to third low-pass filters and the accumulator circuit comprises:

a first adder circuit for adding an input signal and a signal outputted from an AND circuit together and outputting a resultant signal;

(2×n) first latch circuits each delaying the signal outputted from the first adder circuit according to timing of the SCLK;

a first gain adjuster circuit for adjusting a delay signal outputted as an output signal from a last of the first latch circuits with predetermined gain;

the AND circuit, supplied with the BGP, for outputting a signal outputted from the first gain adjuster circuit to the first adder circuit only during a period of the BGP;

(2×n) second latch circuits each delaying the delay signal outputted from the last of the first latch circuits as output signals according to timing of the SCLK;

a second gain adjuster circuit for adjusting a delay signal outputted from a last of the second latch circuits with predetermined gain;

a third gain adjuster circuit for adjusting the delay signal outputted as an output signal from the last of the first latch circuits with predetermined gain; and a second adder circuit for adding a signal outputted from the second gain adjuster circuit and a signal outputted from the third gain adjuster circuit together and outputting a resultant signal as an output signal.

As described above, the third to tenth aspects indicate detailed structures of the first to third low-pass filter circuits and the accumulation circuit in the first and second aspects. Thus, according to the third to tenth aspects, by using even-numbered latch circuits for delay, the color modulation apparatus can perform filtering to pass R-Y and B-Y signals after multiplexing and can also accumulate these signals, without damaging them (that is, it is possible to perform filtering and accumulation of R-Y and B-Y signals separately).

BRIEF DESCRIPTION OF THE DRAWINGS

FIG. 11 shows a block diagram illustrating the configuration of a conventional color demodulation apparatus.

BEST MODE FOR CARRYING OUT THE INVENTION

Described below are embodiments of the present invention with reference to the drawings.
(First Embodiment)

Figure 1:
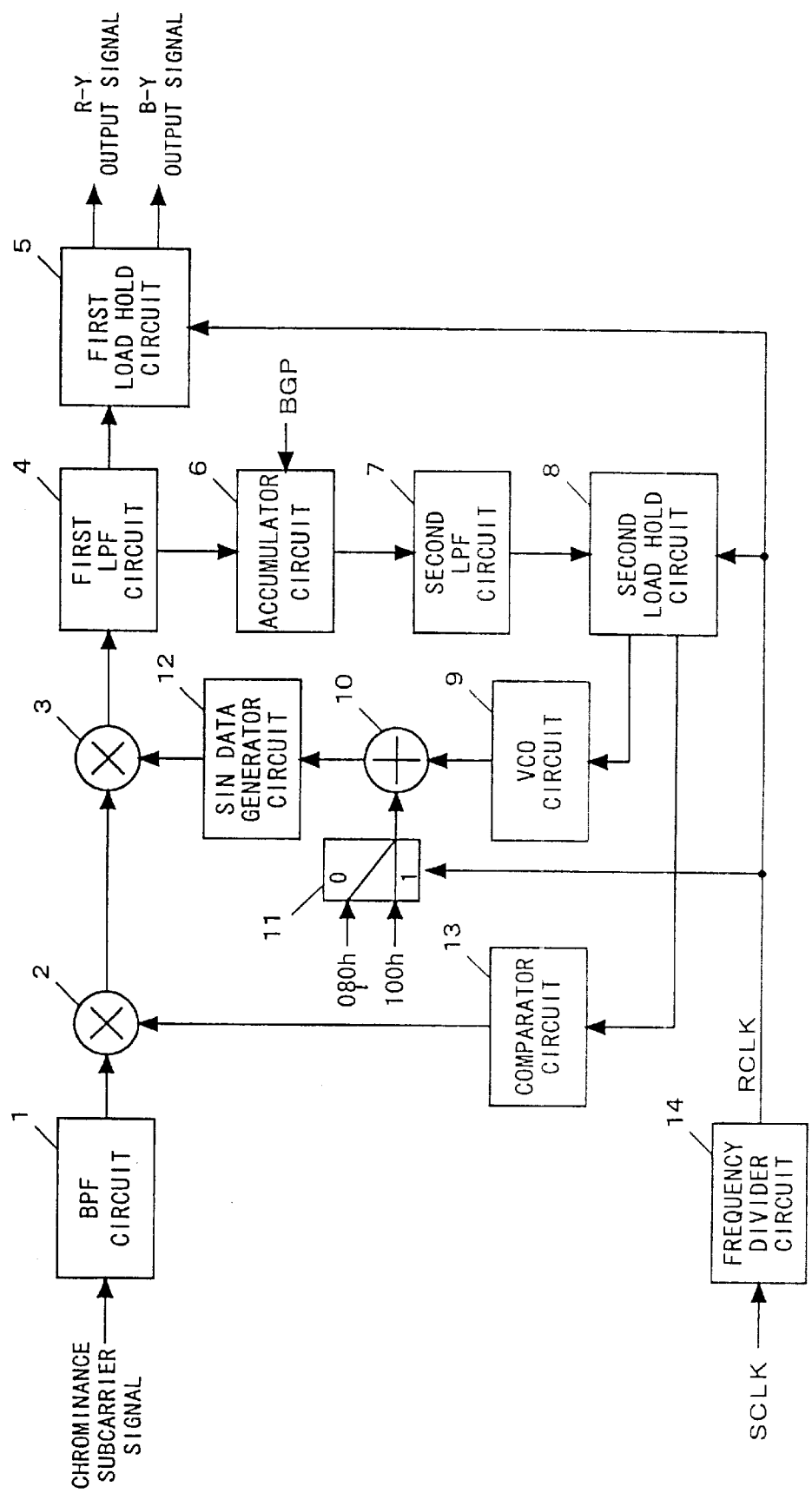
FIG. 1 shows a block diagram illustrating the configuration of a color demodulation apparatus according to a first embodiment of the present invention.

FIG. 1 shows a block diagram illustrating the configuration of a color demodulation apparatus according to a first embodiment of the present invention. In FIG. 1, the color demodulation apparatus according to the first embodiment of the present invention includes a BPF circuit 1, multiplier circuits 2 and 3, first LPF circuit 4, a first load hold circuit 5, an accumulator circuit 6, a second LPF circuit 7, a second load hold circuit 8, a VCO circuit 9, an adder circuit 10, a SW circuit 11, a SIN data generator circuit 12, a comparator circuit 13, and a frequency divider circuit 14.

A flow of basic color demodulation processing by sequentially explaining the operation of the BPF circuit 1, the multiplier circuits 2 and 3, the first LPF circuit 4, and the first load hold circuit 5 is first described.

The BPF circuit 1 is a band-pass filter allowing passage of the frequency band of a chrominance subcarrier signal. The BPF circuit 1 is supplied with the chrominance subcarrier signal separated from a composite digital video signal, and eliminates signal components of an unnecessary frequency band. According to gain control from the comparator circuit 13 which will be described later, the multiplier circuit 2 performs control (ACC) over its output to keep a predetermined amplitude with respect to the received chrominance subcarrier signal. The multiplier circuit 3 is supplied with the chrominance subcarrier signal after ACC processing outputted from the multiplier circuit 2, and multiplying the chrominance subcarrier signal by a phase alternate SIN wave signal outputted from the SIN data generator circuit 12, which will be described later, to perform multiplex demodulation on both R-Y and B-Y signals. The first LPF circuit 4 is a low-pass filter allowing passage of the frequency bands of the R-Y and B-Y signals, eliminating predetermined high frequency band components (such as noise) from a signal after multiplex demodulation by the multiplier circuit 3 and then outputting the multiplex-demodulated signal to the first load hold circuit 5 and the accumulator circuit 6. According to a load clock (hereinafter referred to as RCLK) supplied from the frequency divider circuit 14 which will be described later, the first load hold circuit 5 separates the received multiplex-demodulated signal into an R-Y signal and a B-Y signal, and then outputs each signal.

Next, using FIGS. 2 to 8, the operation of the accumulator circuit 6, the second LPF circuit 7, the second load hold circuit 8, the VCO circuit 9, the adder circuit 10, the SW circuit 11, the SIN data generator circuit 12, and the frequency divider circuit 14 is sequentially described. Also, a first feedback loop for accurate R-Y and B-Y demodulation always in synchronization with burst signals is described.

Figure 2:
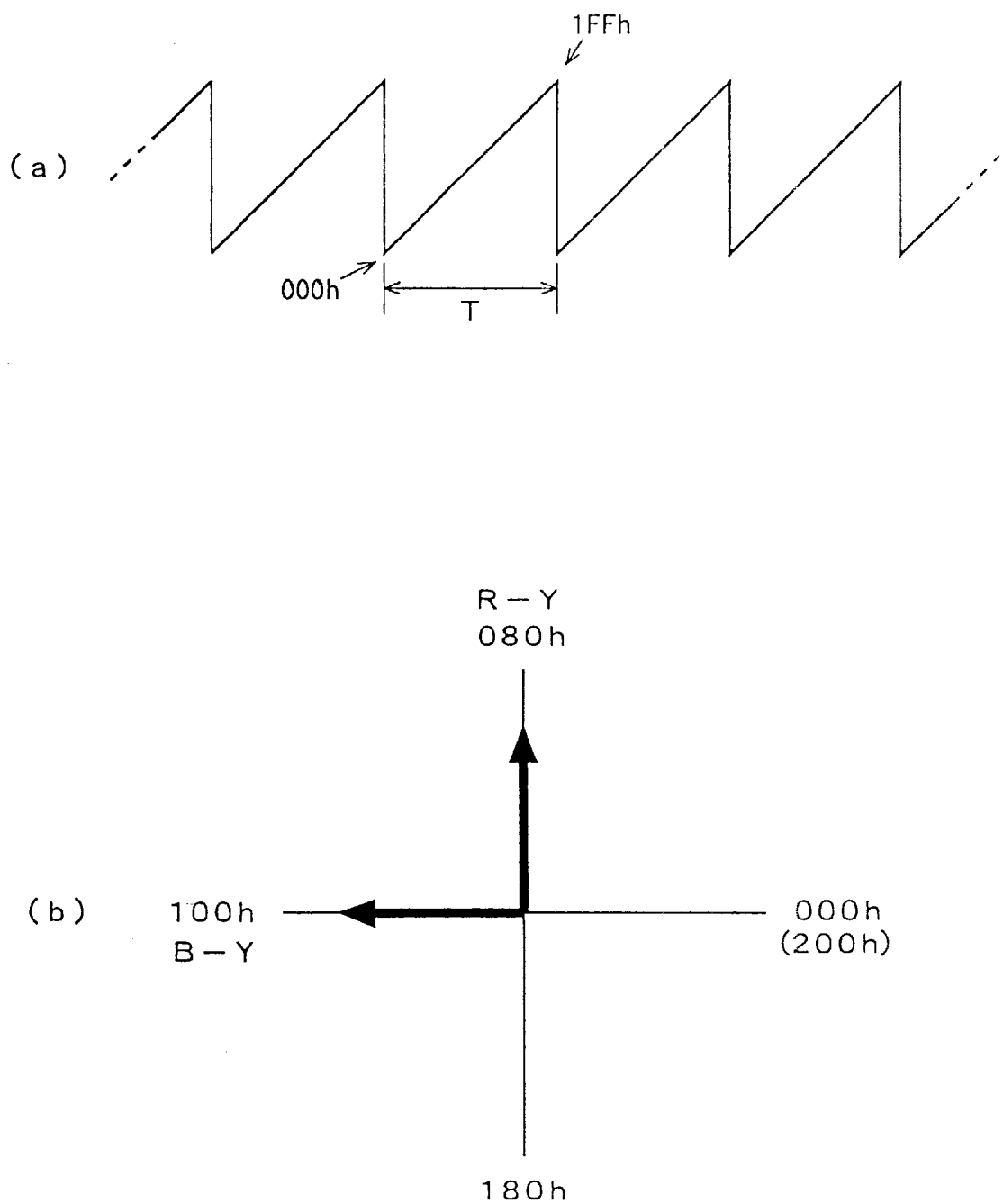
FIG. 2 shows a diagram exemplarily illustrating a ramp wave outputted from a VCO circuit 9.
Figure 3:
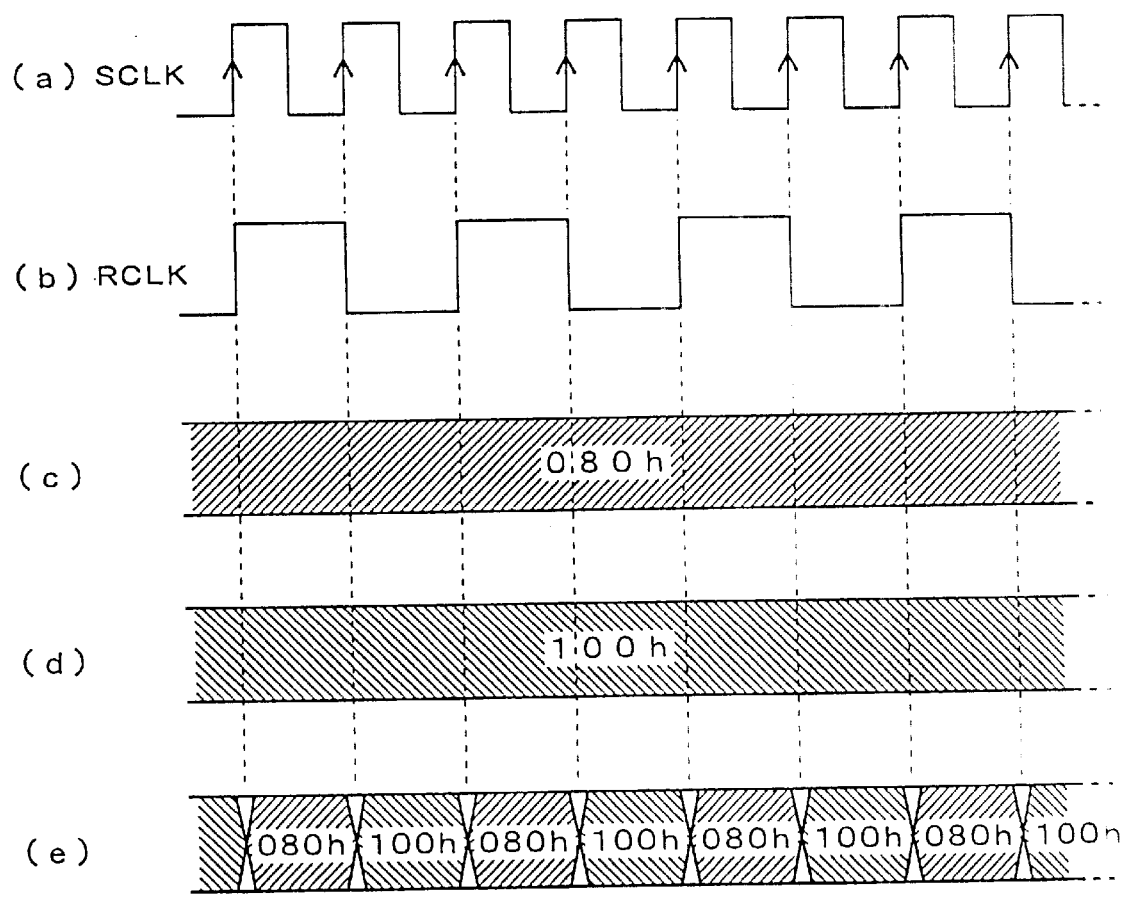
FIG. 3 shows a timing chart illustrating the processing in a SW circuit 11.
Figure 4:
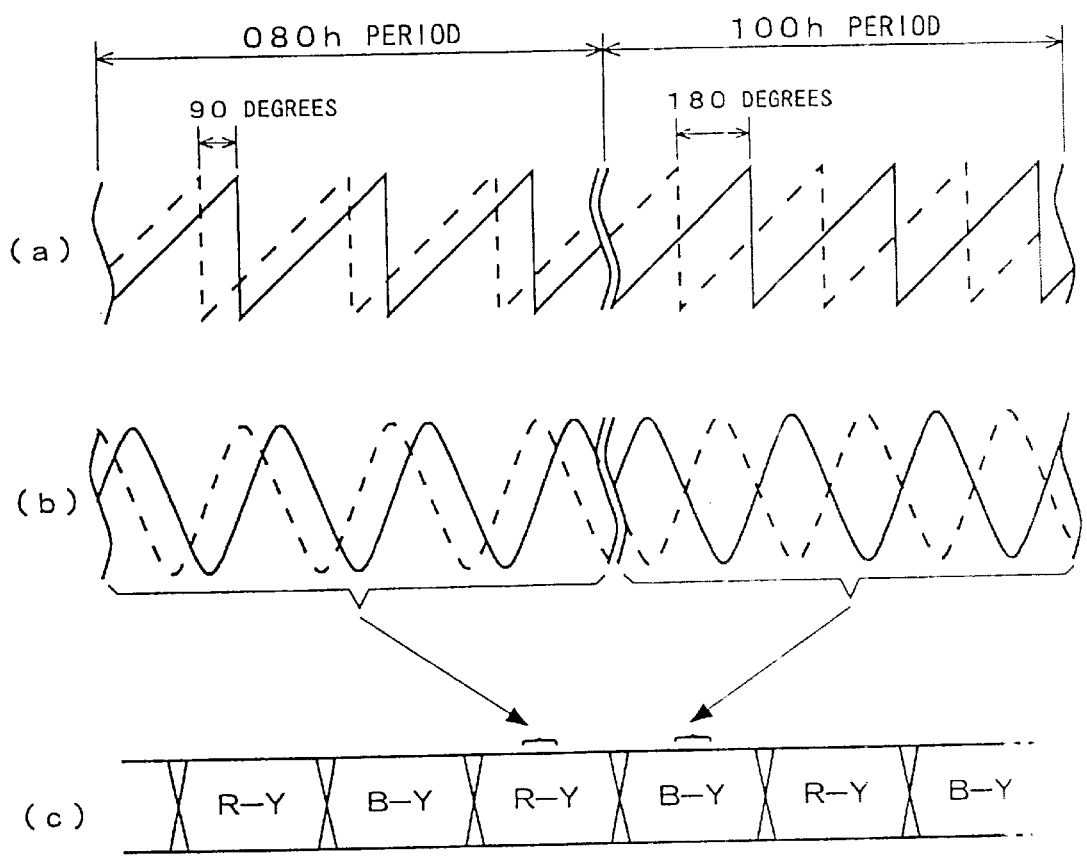
FIG. 4 shows a diagram illustrating output waveforms in an adder circuit 10, a SIN data generator circuit 12, and a multiplier circuit 3.
Figure 5:
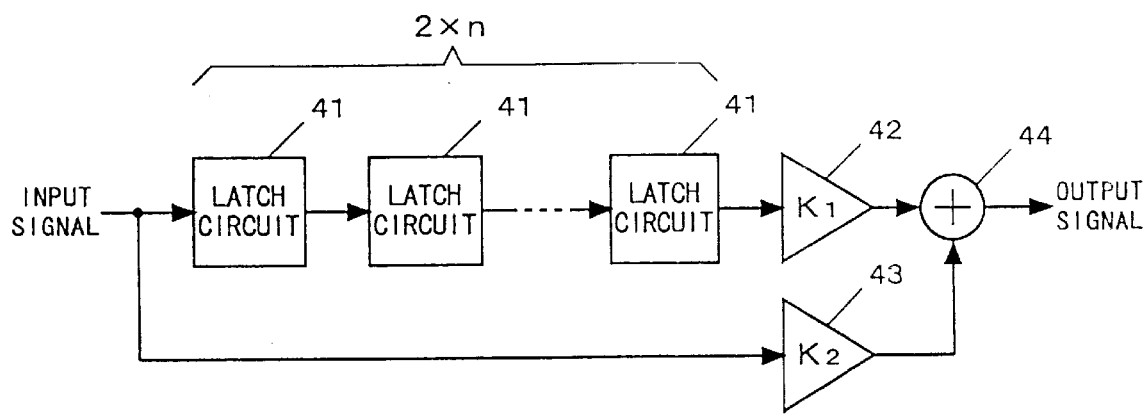
FIG. 5 shows a block diagram illustrating an example of a detailed structure of first and second LPF circuits 4 and 7.
Figure 6:
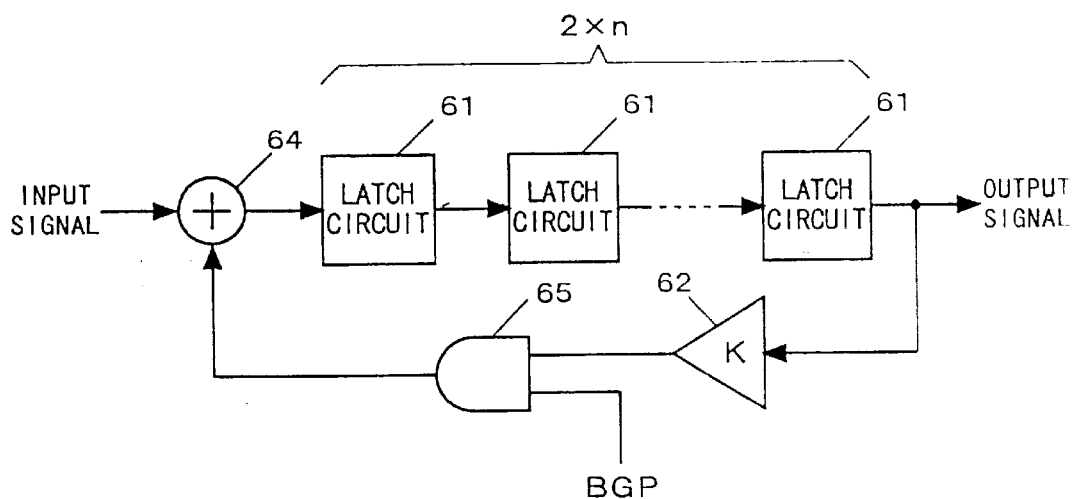
FIG. 6 shows a block diagram illustrating an example of a detailed structure of an accumulator circuit 6.
Figure 7:
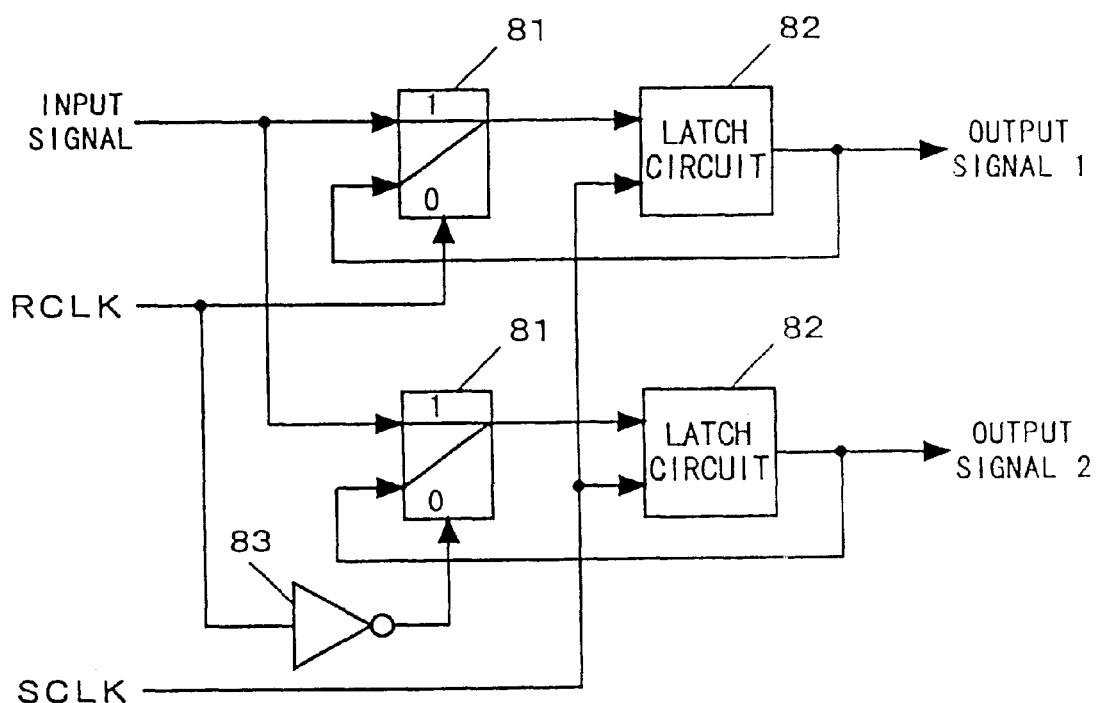
FIG. 7 shows a block diagram exemplarily illustrating a detailed structure of first and second load hold circuits 5 and 8.
Figure 8:
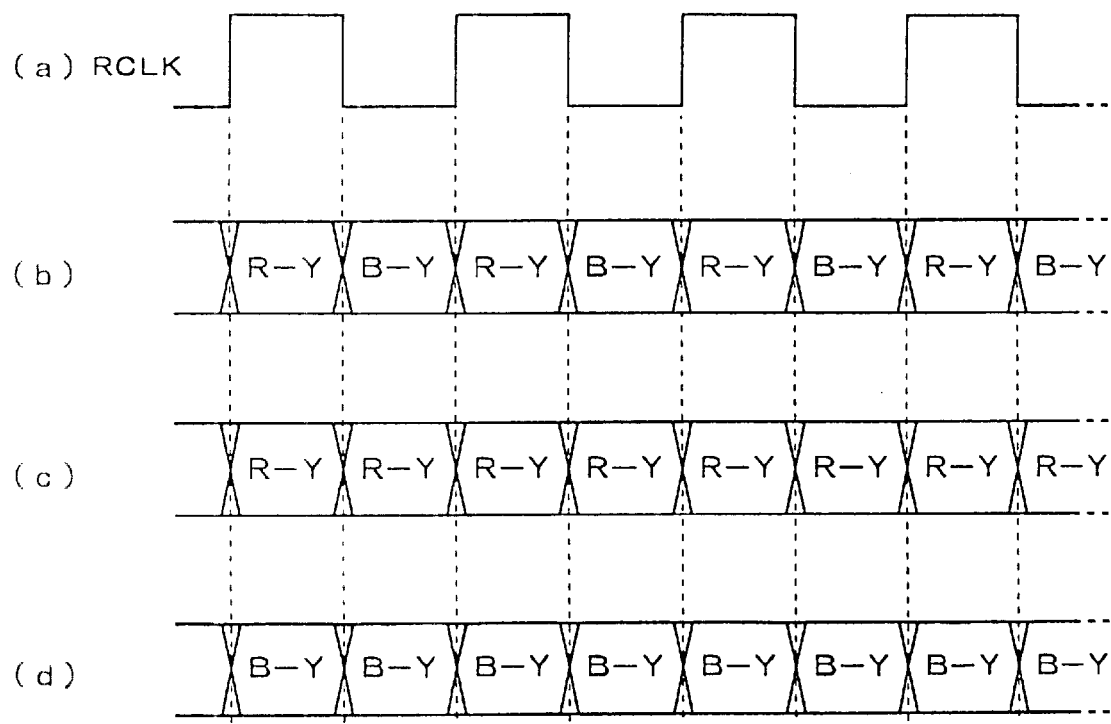
FIG. 8 shows a timing chart illustrating the processing in the first load hold circuit 5.

FIG. 2 shows a diagram exemplarily illustrating a ramp wave outputted from the VCO circuit 9. FIG. 3 shows a timing chart illustrating timing in the processing in the SW circuit 11. FIG. 4 shows a diagram illustrating output waveforms in the adder circuit 10, the SIN data generator circuit 12, and the multiplier circuit 3. FIG. 5 shows a block diagram illustrating an example of a detailed structure of the first and second LPF circuits 4 and 7. FIG. 6 shows a block diagram illustrating an example of a detailed structure of the accumulator circuit 6. FIG. 7 shows a block diagram exemplarily illustrating a detailed structure of the first and second load hold circuits 5 and 8. FIG. 8 shows a timing chart illustrating the processing in the first load hold circuit 5.

The VCO circuit 9 is a voltage controlled oscillator circuit outputting a ramp wave as shown in FIG. 2(a). The VCO circuit 9 can vary a period T of the ramp wave according to the level of an input signal, and can control the period T of the ramp wave to be shorter as the level of the input signal is higher and to be longer as the level is lower. Here, the data indicated by the ramp wave outputted from the VCO circuit 9 during the period T (0 to 360 degrees in vector phase) corresponds to data "000h" to data "1FFh" in a hexadecimal (HEX) signal (FIG. 2(a)). Therefore, data "080h" corresponds to 90 degrees in vector phase, and data "100h" to 180 degrees therein (FIG. 2(b)).

The SW circuit 11 is a switching circuit selectively outputting one of two input signals according to a control signal externally provided. One of the two input signals to the SW circuit 11 indicates data "080h" (FIG. 3(c)), and the other indicates data "100h" (FIG. 3(d)). The control signal is RCLK (FIG. 3(b)) outputted from the frequency divider circuit 14.

Here, the frequency divider circuit 14 generates RCLK shown in FIG. 3(b) using a system clock (hereinafter referred to as SCLK), which is an operational reference for the entire apparatus, as shown in FIG. 3(a). Therefore, the signal outputted from the SW circuit 11 indicates data (FIG. 3(e)) alternating between data "080h" and data "100h" for each SCLK.

The adder circuit 10 adds the data (FIG. 3(e)) outputted from the SW circuit 11 to that of the ramp wave (FIG. 2(a)) outputted from the VCO circuit 9. Therefore, a ramp wave outputted from the adder circuit 10 is phase-shifted 90 degrees in vector phase during the period when data "080h" is added, and phase-shifted in 180 degrees during the period when data "100h" is added (FIG. 4(a)).

Using the received ramp wave, the SIN data generator circuit 12 generates and outputs a SIN wave signal synchronizing with the ramp wave. Therefore, according to the ramp wave (FIG. 4(a)) outputted from the adder circuit 10, the SIN data generator circuit 12 generates, in a time-division manner, a 90-degree-phase-shifted SIN wave signal during the period when data "080h" is added and a 180-degree-phase-shifted SIN wave signal during the period when data "100h" is added. The SIN data generator circuit 12 then outputs a phase alternate SIN wave signal with its phase repeatedly alternating between 90 and 180 degrees for each clock of SCLK (FIG. 4(b)), to the multiplier circuit 3.

Therefore, the multiplier circuit 3 multiplies the phase alternate SIN wave signal (FIG. 4(b)) from the SIN data generator circuit 12 by the chrominance subcarrier signal from the multiplier circuit 2, and alternately outputs signals demodulated in two axes, i.e., 90 degrees (R-Y) and 180 degrees (B-Y) in vector phase, for each SCLK (FIG. 4(*c*)). The signal outputted from the multiplier circuit 3 as shown in FIG. 4(*c*) is herein referred to as an R-Y/B-Y multiplexed signal. This R-Y/B-Y multiplexed signal is supplied to the first LPF circuit 4.

The first LPF circuit 4 then eliminates, as described above, predetermined high frequency band components (such as noise) from the R-Y/B-Y multiplexed signal (FIG. 4(*c*)) fed by the multiplier circuit 3, and outputs the resultant signal to the first load hold circuit 5 and the accumulator circuit 6.

An example of a detailed structure of the first LPF circuit 4 is shown in FIG. 5. In FIG. 5, the first LPF circuit 4 includes (2×n) latch circuits 41 (n is a positive integer), gain adjustment circuits 42 and 43, and an adder circuit 44. As shown in FIG. 5, the (2×n) latch circuits 41 each delay an input signal at timing of SLCK. The gain adjustment circuit 42 adjusts the delayed signal outputted from the last latch circuit 41 with predetermined gain (K1). The gain adjustment circuit 43 adjusts the input signal with predetermined gain (K2). The adder circuit 44 are supplied with the adjusted signals outputted from the gain adjustment circuits 42 and 43, adds these two signals together, and then outputs the resultant signal. The first LPF circuit 4 can thus perform filtering to pass the R-Y and B-Y signals after multiplexing without damaging these signals (that is, the first LPF circuit 4 can perform filtering to pass the R-Y and B-Y signals separately).

The accumulator circuit 6 accumulates a burst signal from the received R-Y/B-Y multiplexed signal (FIG. 4(*c*)), according to a BGP from a horizontal deflection apparatus (not shown). The accumulator circuit 6 then outputs the resultant burst signal to the second LPF circuit 7 once during each horizontal period.

An example of the detailed structure of the accumulator circuit 6 is shown in FIG. 6. In FIG. 6, the accumulator circuit 6 includes an adder circuit 64, (2×n) latch circuits 61, a gain adjustment circuit 62, and an AND circuit 65. As shown in FIG. 6, the adder circuit 64 is supplied with an input signal and a signal outputted from the AND circuit 65, adds these two signals together, and then outputs the resultant signal. The (2×n) latch circuits 61 delay the signal outputted from the adder circuit 64 at timing of SCLK. The gain adjustment circuit 62 adjusts the delayed signal outputted from the last latch circuit 61 with predetermined gain (K). The AND circuit 65 operates at timing of BGP to feed-back to the adder circuit 64 the adjusted signal outputted from the gain adjustment circuit 62 only during the burst period. The accumulator circuit 6 can thus accumulate a burst signal.

The second LPF circuit 7 is a low-pass filter with its cutoff frequency previously set to several Hz (preferably, 2 to 3 Hz) therein, and is constructed as a lag-lead type, for example. The signal with its high frequency band components cut off by the second LPF circuit 7 is fed to the second load hold circuit B.

The structure of the second LPF circuit 7 is similar to that of the above first LPF circuit 4 (refer to FIG. 5). The second LPF circuit 7 adjusts a signal obtained by delaying an input signal using even-numbered latch circuits and the input signal with predetermined gains, adds these signals together, and outputs the resultant signal. The second LPF circuit 7 can thus perform filtering to pass the accumulated burst signal.

The second load hold circuit 8 separates the accumulated burst signal outputted from the accumulator circuit 6 into a burst signal in the R-Y signal and a burst signal in the B-Y signal according to RCLK from the frequency divider circuit 14, and outputs each burst signal. Here, the accumulated burst signal in the R-Y signal is fed to the VCO circuit 9, thereby forming the first feedback loop.

An example of a detailed structure of the second load hold circuit 8 is shown in FIG. 7. In FIG. 7, the second load hold circuit 8 includes two SW circuits 81, two latch circuits 82, and a NOT circuit 83. As shown in FIG. 7, the two SW circuits 81 are each supplied with an input signal and a signal outputted from the corresponding one of the two latch circuits 82. According to RCLK or RCLK reversed by the NOT circuit 83, the two SW circuits 81 each alternately output these signals through switching. The two latch circuits 82 each output the signal outputted from the corresponding one of the two SW circuits 81 at timing of SCLK. In this way, the second load hold circuit 8 separates an input signal into an accumulated burst signal in the R-Y signal and an accumulated burst signal in the B-Y signal.

Then, the VCO circuit 9 is supplied with the accumulated burst signal in the R-Y signal outputted from the second load hold circuit 8. According to the accumulated burst signal, the VCO circuit 9 controls the period T of the ramp wave to be outputted (FIG. 2(*a*)) to synchronize with the period of the accumulated burst signal.

The demodulation apparatus according to the first embodiment can thus perform accurate R-Y and B-Y demodulation always in synchronization with burst signals.

The operation of the comparator circuit 13 and the operation of a second feedback loop capable of always obtaining a constant color signal amplitude are next described.

The accumulated burst signal in the B-Y signal separated in the second load hold circuit 8 is fed to the comparator circuit 13. The comparator circuit 13 has a predetermined reference value (this reference value may be previously stored therein, or may be externally provided), and compares the value of the received accumulated burst signal in the B-Y signal with the reference value. The comparator circuit 13 then controls gain of the multiplier circuit 2 so that the value of the accumulated burst signal matches the reference value.

The demodulation apparatus according to the first embodiment of the present invention can thus always obtain a constant color signal amplitude.

Finally, the first load hold circuit 5 is supplied with R-Y/B-Y multiplexed signal (FIG. 8 (*b*)) outputted from the first LPF circuit 4 after eliminating high frequency band components, as described above. The first load hold circuit 5 then separates the R-Y/B-Y multiplexed signal into an R-Y signal (FIG. 8(*c*)) and a B-Y signal (FIG. 8(*d*)) according to RCLK (FIG. 8(*a*)) outputted from the frequency divider circuit 14, and outputs these signals.

The structure of the first load hold circuit 5 is similar to that of the second load hold circuit 8 (refer to FIG. 7). The first load hold circuit 5 is provided with two systems each including the SW circuit 81 and the latch circuit 82, and separates an input signal into an R-Y signal and a B-Y signal by alternately operating the two systems according to RCLK.

As described above, the color demodulation apparatus according to the first embodiment of the present invention is realized by using a multiplex demodulation technique, with circuitry configuration sharing the circuit for R-Y demodulation and the circuit for B-Y demodulation, and part of the circuits constituting the first feedback loop and part of the circuits constituting the second feedback loop.

Thus, since plural circuits each performing similar processing are not required, the color demodulation apparatus can be reduced in size. Specifically, the number of gates when the color demodulation apparatus according to the first embodiment (approximately 6,100) is constructed by semiconductors can be reduced by approximately 25%, compared with the number of gates in the conventional color demodulation apparatus (refer to FIG. 11)(approximately 8,100). Therefore, low power consumption and cost reduction can be achieved.

In the color demodulation apparatus according to the first embodiment, the data on the ramp wave (FIG. 2(a)) outputted from the VCO circuit 9 corresponds to data "000h" to data "1FFh" in a HEX signal during the period T. However, the data on the ramp wave may correspond to another data range. In this case, as a matter of course, R-Y and B-Y demodulation is performed using new data corresponding to 90 degrees in vector phase in that data range and new data corresponding to 180 degrees therein.

Further, in the color demodulation apparatus according to the first embodiment, it is presumed that the R-Y demodulation axis indicates 90 degrees in phase, while B-Y demodulation axis indicates 180 degrees in phase (refer to FIG. 2(b)). The present invention can, however, arbitrarily set another phase for color demodulation axes. To set another phase, the input data to the SW circuit 11, which determines color demodulation axes, is set to desired HEX signal data.

Figure 9:
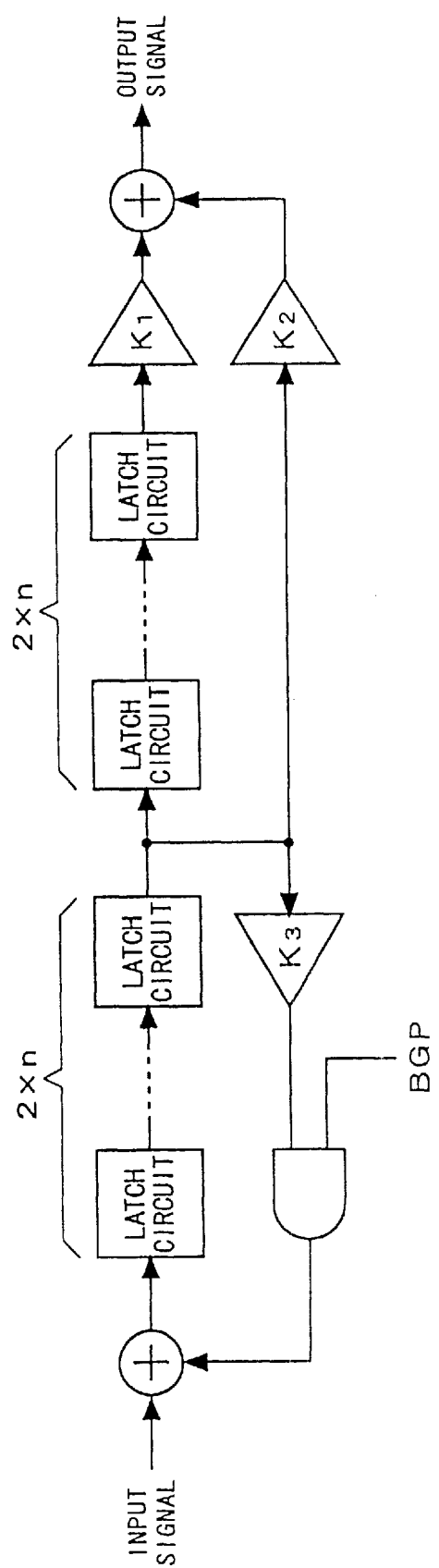
FIG. 9 shows a block diagram illustrating another example of a detailed structure of first and second LPF circuits 4 and 7 and the accumulator circuit 6.

Still further, in the color demodulation apparatus according to the first embodiment, the structure of the first LPF circuit 4 and the second LPF circuit 7 is exemplarily shown in FIG. 5, and the structure of the accumulator circuit 6 is exemplarily shown in FIG. 6. These circuits, however, can be structured by combining FIGS. 5 and 6, as shown in FIG. 9,. Note that since not required to be operated during the burst signal period, the first LPF circuit 4 is structured with the AND circuit deleted.

(Second Embodiment)

Figure 10:
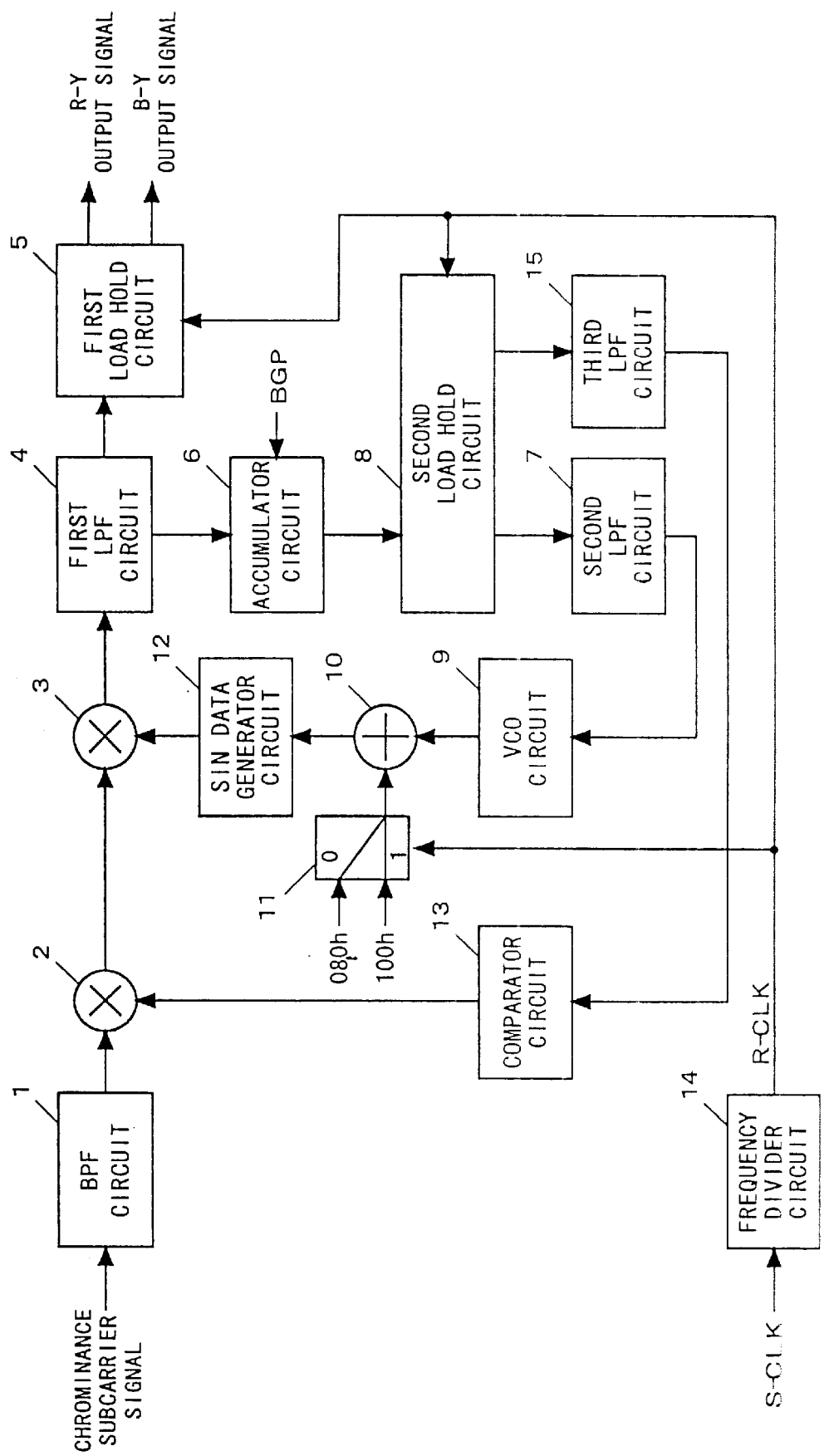
FIG. 10 shows a block diagram illustrating the configuration of a color demodulation apparatus according to a second embodiment of the present invention.

FIG. 10 shows a block diagram illustrating the configuration of a color demodulation apparatus according to a second embodiment of the present invention. In FIG. 10, the color demodulation apparatus according to the second embodiment of the present embodiment includes the BPF circuit 1, the multiplier circuits 2 and 3, the first LPF circuit 4, the first load hold circuit 5, the accumulator circuit 6, the second load hold circuit 8, the second LPF circuit 7, a third LPF circuit 15, the VCO circuit 9, the adder circuit 10, the SW circuit 11, the SIN data generator circuit 12, the comparator circuit 13, and the frequency divider circuit 14.

As shown in FIG. 10, the color demodulation apparatus according to the second embodiment has the similar configuration to that of the above color demodulation apparatus according to the first embodiment, with the processing order of the second LPF circuit 7 and the second load hold circuit 8 interchanged and with the third LPF circuit 15 for outputting a signal to the comparator circuit 13 newly provided.

Since other configuration of the color demodulation apparatus according to the second embodiment is similar to that of the first embodiment, the same components as those in the first embodiment are provided with the same reference numerals, and their description is omitted herein.

The accumulated burst signal outputted from the accumulator circuit 6 is fed to the second load hold circuit 8 only once during each horizontal period. The second load hold circuit 8 then separates the accumulated burst signal outputted from the accumulator circuit 6 into a burst signal in the R-Y signal and a burst signal in the B-Y signal, according to RCLK outputted from the frequency divider circuit 14. The second load hold circuit 8 then outputs the accumulated burst signal in the R-Y signal to the second LPF circuit 7, and the accumulated burst signal in the B-Y signal to the third LPF circuit 15.

The second LPF circuit 7 cuts off predetermined high frequency band components of the received accumulated burst signal in the R-Y signal, and then outputs the resultant signal to the VCO circuit 9. On the other hand, the third LPF circuit 15 is a low-pass filter circuit with its cutoff frequency previously set to several Hz (preferably, not more than 2 Hz). The third LPF circuit 15 cuts off the high frequency band components of the accumulated burst signal of the received B-Y signal, and outputs the resultant signal to the comparator circuit 13.

Therefore, it is possible to make a difference between the frequency characteristics (noise response) of the accumulated burst signal in the R-Y signal to be outputted to the VCO circuit and those in the B-Y signal to be outputted to the comparator circuit 13.

As described above, the color demodulation apparatus according to the second embodiment of the present invention is provided with two different LPF circuits, i.e., the LPF circuit for band-limiting the burst signal to be outputted to the VCO circuit 9 and the LPF circuit for band-limiting the burst signal to be outputted to the comparator circuit 13.

Therefore, although its circuitry is larger in size than that of the color demodulation apparatus according to the first embodiment (the number of gates is approximately 6,500 when constructed by semiconductors), the color demodulation apparatus according to the second embodiment can make a difference between the frequency characteristics in the first feedback loop and in the second feedback loop, thereby realizing color demodulation of higher image quality.

Industrial Applicability

As described above, for color demodulation of the color subcarrier signal separated from the television composite video signal through digital processing, the color demodulation apparatus of the present invention has color demodulation capabilities as the conventional ones, and can be used with its size reduced by sharing part of processing circuits therein.

What is claimed is:

1. A color demodulation apparatus color-demodulating a chrominance subcarrier signal separated from a composite television video signal through digital processing, comprising:

frequency divider means for generating a predetermined load clock (hereinafter referred to as RCLK) using a system clock (hereinafter referred to as SCLK) which is an operational reference for the apparatus;

band-pass filter means, supplied with said chrominance subcarrier signal, for eliminating signal components of an unnecessary frequency band from the chrominance subcarrier signal;

first multiplier means, supplied with said chrominance subcarrier signal from said band-pass filter means, for controlling the chrominance subcarrier signal to be outputted therefrom to keep constant amplitude according to gain controlled by comparator means;

second multiplier means, supplied with said chrominance subcarrier signal after amplitude control outputted from said first multiplier means and a phase alternate SIN wave signal outputted from SIN data generator means, for multiplying the signals together for multiplex demodulation of an R-Y signal and a B-Y signal;

first low-pass filter means, supplied with a multiplex-demodulated signal from said second multiplier means, for passing frequency bands of the R-Y signal and the B-Y signal and eliminating predetermined high frequency band components;

first load hold means, supplied with said multiplex-demodulated signal with the high frequency band components eliminated outputted from said first low-pass filter means, for separating the multiplex-demodulated signal into the R-Y signal and the B-Y signal and outputting the R-Y and B-Y signals according to said RCLK;

accumulator means, supplied with said multiplex-demodulated signal with the high frequency band components eliminated outputted from said first low-pass filter means, for accumulating burst signal in the R-Y signal and burst signal in the B-Y signal based on a burst gate pulse (hereinafter referred to as BGP) which provides a burst signal period and outputting each of the accumulated burst signal only once during each horizontal period;

second low-pass filter means, supplied with each burst signal outputted from said accumulator means, for passing the frequency bands of the R-Y signal and the B-Y signal and eliminating predetermined high frequency band components;

second load hold means, supplied with each of said burst signal with the high frequency band components eliminated outputted from said second low-pass filter means, for separating the burst signal into burst signal in the R-Y signal and burst signal in the B-Y signal and outputting each of the burst signal according to said RCLK;

VCO means, supplied with the burst signal in the R-Y signal outputted from said second load hold means, for varying and outputting a period of a ramp wave according to a level of the burst signal in the R-Y signal;

switching means, supplied with data corresponding to an R-Y demodulation axis and data corresponding to a B-Y demodulation axis in the ramp wave outputted from said VCO means, for alternately switching between the data for output according to said RCLK;

adder means for adding data outputted from said switching means to data on the ramp wave outputted from said VCO means and outputting a ramp wave;

said SIN data generator means for generating and outputting said phase alternate SIN wave signal in synchronization with the ramp wave outputted from said adder means; and said comparator means, supplied with the burst signal in the B-Y signal outputted from said second load hold means, for comparing a value of the burst signal with a predetermined reference value and controlling the gain of said first multiplier means so that the value of the burst signal matches the reference value.

2. The color demodulation apparatus according to claim 1, wherein said accumulator means comprises:
adder means for adding an input signal and a signal outputted from AND means together and outputting a resultant signal;
(2×n) latch means (n is a positive integer) each delaying the signal outputted from said adder means according to timing of said SCLK;
gain adjuster means for adjusting a delay signal outputted as an output signal from a last of said latch means with predetermined gain; and
said AND means, supplied with said BGP, for outputting a signal outputted from said gain adjuster means to said adder means only during a period of the BGP.

3. The color demodulation apparatus according to claim 1, wherein each of said first and second low-pass filter means comprises:
(2×n) latch means (n is a positive integer) each delaying an input signal according to timing of said SCLK;
first gain adjuster means for adjusting a delay signal outputted from a last of said latch means with predetermined gain;
second gain adjuster means for adjusting an input signal with predetermined gain; and
adder means for adding a signal outputted from said first gain adjuster means and a signal outputted from said second gain adjuster means together and outputting a resultant signal as an output signal.

4. The color demodulation apparatus according to claim 2, wherein each of said first and second low-pass filter means comprises:
(2×n) latch means (n is a positive integer) each delaying an input signal according to timing of said SCLK;
first gain adjuster means for adjusting a delay signal outputted from a last of said latch means with predetermined gain,
second gain adjuster means for adjusting an input signal with predetermined gain; and
adder means for adding a signal outputted from said first gain adjuster means and a signal outputted from said second gain adjuster means together and outputting a resultant signal as an output signal.

5. The color demodulation apparatus according to claim 1, wherein each of said first and second low-pass filters and said accumulator means comprises:
first adder means for adding an input signal and a signal outputted from AND means together and outputting a resultant signal;
(2×n) first latch means (n is a positive integer) each delaying the signal outputted from said first adder means according to timing of said SCLK;
first gain adjuster means for adjusting a delay signal outputted as an output signal from a last of said first latch means with predetermined gain;
said AND means, supplied with said BGP, for outputting a signal outputted from said first gain adjuster means to said first adder means only during a period of the BGP;
(2×n) second latch means each delaying the delay signal outputted from the last of said first latch means as output signals according to timing of said SCLK;
second gain adjuster means for adjusting a delay signal outputted from a last of said second latch means with predetermined gain;
third gain adjuster means for adjusting the delay signal outputted as an output signal from the last of said first latch means with predetermined gain; and
second adder means for adding a signal outputted from said second gain adjuster means and a signal outputted from said third gain adjuster means together and outputting a resultant signal as an output signal.

6. A color demodulation apparatus color-demodulating a chrominance subcarrier signal separated from a composite television video signal through digital processing, comprising:

frequency divider means for generating a predetermined load clock (hereinafter referred to as RCLK) using a system clock (hereinafter referred to as SCLK) which is an operational reference for the apparatus;

band-pass filter means, supplied with said chrominance subcarrier signal, for eliminating signal components of an unnecessary frequency band from the chrominance subcarrier signal;

first multiplier means, supplied with said chrominance subcarrier signal from said band-pass filter means, for controlling the chrominance subcarrier signal to be outputted therefrom to keep constant amplitude according to gain controlled by comparator means;

second multiplier means, supplied with said chrominance subcarrier signal after amplitude control outputted from said first multiplier means and a phase alternate SIN wave signal outputted from SIN data generator means, for multiplying the signals together for multiplex demodulation of an R-Y signal and a B-Y signal;

first low-pass filter means, supplied with a multiplex-demodulated signal from said second multiplier means, for passing frequency bands of the R-Y signal and the B-Y signal and eliminating predetermined high frequency band components;

first load hold means, supplied with said multiplex-demodulated signal with the high frequency band components eliminated outputted from said first low-pass filter means, for separating the multiplex-demodulated signal into the R-Y signal and the B-Y signal and outputting the R-Y and B-Y signals according to said RCLK;

accumulator means, supplied with said multiplex-demodulated signal with the high frequency band components eliminated outputted from said first low-pass filter means, for accumulating burst signal in the R-Y signal and burst signal in the B-Y signal based on a burst gate pulse (hereinafter referred to as BGP) which provides a burst signal period and outputting each of the accumulated burst signal only once during each horizontal period;

second load hold means, supplied with each of said burst signal with the high frequency band components eliminated outputted from said accumulator means, for separating the burst signal into the burst signal in the R-Y signal and the burst signal in the B-Y signal and outputting each of the burst signal according to said RCLK;

second low-pass filter means, supplied with the burst signal in the R-Y signal outputted from said second load hold means, for passing the frequency band of the R-Y signal and eliminating predetermined high frequency band components;

third low-pass filter means, supplied with the burst signal in the B-Y signal outputted from said second load hold means, for passing the frequency band of the B-Y signal and eliminating predetermined high frequency band components;

VCO means, supplied with the burst signal in the R-Y signal with the high frequency band components eliminated outputted from said second low-pass filter means, for varying and outputting a period of a ramp wave according to a level of the burst signal;

switching means, supplied with data corresponding to an R-Y demodulation axis and data corresponding to a B-Y demodulation axis in the ramp wave outputted from said VCO means, for alternately switching between the data for output according to said RCLK;

adder means for adding data outputted from said switching means to data on the ramp wave outputted from said VCO means and outputting a resultant ramp wave;

said SIN data generator means for generating and outputting said phase alternate SIN wave signal in synchronization with the ramp wave outputted from said adder means; and said comparator means, supplied with the burst signal in the B-Y signal with the high frequency band components eliminated outputted from said third low-pass filter means, for comparing a value of the burst signal and a predetermined reference value and controlling the gain in said first multiplier means so that the value of the burst signal matches the reference value.

7. The color demodulation apparatus according to claim 6, wherein said accumulator means comprises:
adder means for adding an input signal and a signal outputted from AND means together and outputting a resultant signal;
(2×n) latch means (n is a positive integer) each delaying the signal outputted from said adder means according to timing of said SCLK;
gain adjuster means for adjusting a delay signal outputted as an output signal from a last of said latch means with predetermined gain; and
said AND means, supplied with said BGP, for outputting a signal outputted from said gain adjuster means to said adder means only during a period of the BGP.

8. The color demodulation apparatus according to claim 6, wherein each of said first to third low-pass filter means comprises:
(2×n) latch means (n is a positive integer) each delaying an input signal according to timing of said SCLK;
first gain adjuster means for adjusting a delay signal outputted from a last of said latch means with predetermined gain;
second gain adjuster means for adjusting an input signal with predetermined gain; and
adder means for adding a signal outputted from said first gain adjuster means and a signal outputted from said second gain adjuster means together and outputting a resultant signal as an output signal.

9. The color demodulation apparatus according to claim 7, wherein each of said first to third low-pass filter means comprises:
(2×n) latch means (n is a positive integer) each delaying an input signal according to timing of said SCLK;
first gain adjuster means for adjusting a delay signal outputted from a last of said latch means with predetermined gain;
second gain adjuster means for adjusting an input signal with predetermined gain; and
adder means for adding a signal outputted from said first gain adjuster means and a signal outputted from said second gain adjuster means together and outputting a resultant signal as an output signal.

10. The color demodulation apparatus according to claim 6, wherein each of said first to third low-pass filters and said accumulator means comprises:

first adder means for adding an input signal and a signal outputted from AND means together and outputting a resultant signal;

(2×n) first latch means (n is a positive integer) each delaying the signal outputted from said first adder means according to timing of said SCLK;

first gain adjuster means for adjusting a delay signal outputted as an output signal from a last of said first latch means with predetermined gain;

said AND means, supplied with said BGP, for outputting a signal outputted from said first gain adjuster means to said first adder means only during a period of the BGP;

(2×n) second latch means each delaying the delay signal outputted from the last of said first latch means as output signals according to timing of said SCLK;

second gain adjuster means for adjusting a delay signal outputted from a last of said second latch means with predetermined gain;

third gain adjuster means for adjusting the delay signal outputted as an output signal from the last of said first latch means with predetermined gain; and second adder means for adding a signal outputted from said second gain adjuster means and a signal outputted from said third gain adjuster means together and outputting a resultant signal as an output signal.

* * * * *